US010573071B2

(12) United States Patent
Sun et al.

(10) Patent No.: US 10,573,071 B2
(45) Date of Patent: Feb. 25, 2020

(54) PATH PLANNING FOR VIRTUAL REALITY LOCOMOTION

(71) Applicant: NVIDIA Corporation, Santa Clara, CA (US)

(72) Inventors: Qi Sun, Centereach, NY (US); Anjul Patney, Kirkland, WA (US); Omer Shapira, Brooklyn, NY (US); Morgan McGuire, Williamstown, MA (US); Aaron Eliot Lefohn, Kirkland, WA (US); David Patrick Luebke, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/024,609

(22) Filed: Jun. 29, 2018

(65) Prior Publication Data

US 2019/0012832 A1 Jan. 10, 2019

Related U.S. Application Data

(60) Provisional application No. 62/529,959, filed on Jul. 7, 2017.

(51) Int. Cl.
*G06T 19/00* (2011.01)
*G06F 3/01* (2006.01)
*G06T 15/00* (2011.01)

(52) U.S. Cl.
CPC .......... *G06T 19/003* (2013.01); *G06F 3/011* (2013.01); *G06T 15/005* (2013.01); *G06T 19/006* (2013.01); *G06T 2200/04* (2013.01)

(58) Field of Classification Search
CPC .......... G06F 3/011; G06F 3/012; G06F 3/013; G06T 15/20; G06T 19/003; G06T 19/006; G06T 19/20
See application file for complete search history.

(56) References Cited

U.S. PATENT DOCUMENTS

| | | | |
|---|---|---|---|
| 5,649,061 | A | 7/1997 | Smyth |
| 6,154,211 | A | 11/2000 | Kamachi et al. |
| 6,369,952 | B1 | 4/2002 | Rallison et al. |
| 8,379,918 | B2 | 2/2013 | Pfleger et al. |
| 9,208,598 | B2 | 12/2015 | Shuster et al. |
| 9,569,899 | B2 | 2/2017 | Lyren |
| 9,599,821 | B2 | 3/2017 | Van Curen et al. |
| 9,807,361 | B2 | 10/2017 | Kato et al. |
| 9,866,286 | B1 | 1/2018 | Qu et al. |

(Continued)

FOREIGN PATENT DOCUMENTS

| | | |
|---|---|---|
| WO | 2015192117 A1 | 12/2015 |
| WO | 2017177188 A1 | 10/2017 |

(Continued)

OTHER PUBLICATIONS

Azmandian M, Grechkin T, Rosenberg ES. An evaluation of strategies for two-user redirected walking in shared physical spaces. In2017 IEEE Virtual Reality (VR) Mar. 18, 2017 (pp. 91-98). IEEE (Year: 2017).*

(Continued)

*Primary Examiner* — Diane M Wills
(74) *Attorney, Agent, or Firm* — Leydig, Voit & Mayer, Ltd.

(57) ABSTRACT

A method, computer readable medium, and system are disclosed for computing a path for a user to move along within a physical space while viewing a virtual environment in a virtual reality system. A path for a user to physically move along through a virtual environment is determined based on waypoints and at least one characteristic of the physical environment within which the user is positioned, position data for the user is received indicating whether and how much a current path taken by the user has deviated from the path, and an updated path is computed through the virtual environment based on the waypoints and the at least one characteristic of the physical environment.

20 Claims, 16 Drawing Sheets

(56) References Cited

U.S. PATENT DOCUMENTS

| | | | |
|---|---|---|---|
| 2014/0240351 A1 | 8/2014 | Scavezze et al. | |
| 2016/0027218 A1 | 1/2016 | Salter et al. | |
| 2016/0085302 A1 | 3/2016 | Publicover et al. | |
| 2016/0147408 A1 | 5/2016 | Bevis et al. | |
| 2016/0210780 A1 | 7/2016 | Paulovich et al. | |
| 2017/0068119 A1 | 3/2017 | Antaki et al. | |
| 2017/0090194 A1 | 3/2017 | Hayes | |
| 2017/0090562 A1 | 3/2017 | Gustafsson et al. | |
| 2017/0109513 A1 | 4/2017 | Skogo et al. | |
| 2017/0123488 A1 | 5/2017 | Guenter et al. | |
| 2017/0123489 A1 | 5/2017 | Guenter | |
| 2017/0139211 A1 | 5/2017 | Trail | |
| 2017/0148214 A1 | 5/2017 | Muniz-Simas et al. | |
| 2017/0185144 A1 | 6/2017 | Li | |
| 2017/0261610 A1 | 9/2017 | Scally et al. | |
| 2017/0285742 A1 | 10/2017 | Marggraff et al. | |
| 2018/0008141 A1 | 1/2018 | Krueger | |
| 2018/0165881 A1* | 6/2018 | Pohl | G06F 3/013 |

FOREIGN PATENT DOCUMENTS

| | | | |
|---|---|---|---|
| WO | 2017180990 A1 | 10/2017 | |
| WO | 2017196394 A1 | 11/2017 | |

OTHER PUBLICATIONS

Chen H, Fuchs H. Supporting free walking in a large virtual environment: imperceptible redirected walking with an immersive distractor. InProceedings of the Computer Graphics International Conference Jun. 27, 2017 (p. 22). ACM (Year: 2017).*

Sun et al., U.S. Appl. No. 16/024,591, filed Jun. 29, 2018.

Razzaque et al., "Redirected Walking," Eurographics, 2001, 6 pages.

Sun et al., "Mapping Virtual and Physical Reality," Siggraph '16 Technical Paper, Jul. 24-28, 2016, pp. 1-12.

Bolte et al., "Subliminal Reorientation and Repositioning in Immersive Virtual Environments using Saccadic Suppression," IEEE Transactions on Visualization and Computer Graphics, vol. 21, No. 4, Apr. 2015, pp. 545-552.

Langbehn et al., "Application of Redirected Walking in Room-Scale VR," IEEE, 2017, 2 pages, retrieved from https://basilic.informatik. uni-hamburg.de/Publications/2017/LLBS17a/template.pdf.

Tobii Tech, "Tobii Eye Tracking: the next step in VR," tobii tech, 2018, 5 pages, retrived from https://www.tobii.com/tech/products/vr/.

Grechkin, et al., "Revisiting detection thresholds for redirected walking: Combining translation and curvature gains," USC Institute for Creative Technologies, pp. 113-120.

Sridharan, et al., "Automatic Target Prediction and Subtle Gaze Guidance for Improved Spatial Information Recall," 2015, pp. 99-106.

Pomarjanschi, et al., "Gaze guidance reduces the number of collisions with pedestrians in a driving simulator," ACM Transactions on Interactive Intelligent Systems, vol. 1, No. 2, Article 8, Jan. 2012.

Kim, et al., "Look at me: Augmented reality pedestrian warning system using an in-vehicle volumetric head up display," IUI 2016, Wearable and Mobile IUI, Sonoma, CA, pp. 294-298.

* cited by examiner

Function RenderRedirected()

1. $E_{curr}$ = GetLatestEyePos()
2. $H_{curr}$ = GetLatestHeadPose()
3. $G_{curr}$ = GetCombinedGazePosition($H_{curr}$, $E_{curr}$)
4. $\Delta_G$ = MeasureAngle(Gcurr, Gprev)
5. $\Delta_H$ = MeasureAngle(Hcurr, Hprev)
6. $\Gamma_G = 0$
7. $\Gamma_H = 0$ // Detect visual suppression events
8. $\Delta_T$ = GetFrameDeltaTime()
9. If $\Delta_G > 180 * \Delta_T$ then
10. $\Gamma_G = 12.6 * \Delta_T$ // perform path planning and correction
11. $\theta$ = GetPreplannedPathTargetOrientation()
12. $\alpha$ = GetDeviationFromPrePlannedPath()
13. $\theta = \theta + \theta'(\alpha)$
14. $\Delta_\theta$ = MeasureAngle($\theta$, $H_{curr}$)
15. If (sgn($\Delta_\theta$) == sgn($\Delta_H$)) then $\lambda = 0.49$ else $\lambda = -0.2$
16. $\Gamma_H = \lambda \cdot \Delta_H$
17. $\Delta_\theta$ = sgn($\Delta_\theta$) · min( $\|\Gamma_H\| + \|\Gamma_G\|$, $\|\Delta_\theta\|$ )
18. ModifyCameraViewpoint( $\Delta_\theta$ )

// Subtle gaze direction (SGD) and rendering
19. If SGDMode is ObjectSpace then
    i. Modulate material luminance of selected objects
20. Draw current frame
21. If SGDMode is ImageSpace then
    i. Modulate luminance of selected peripheral pixels
22. Display rendered frame
23. $G_{prev} = G_{curr}$

*Fig. 2E*

PATH PLANNING FOR VIRTUAL REALITY LOCOMOTION

CLAIM OF PRIORITY

This application claims the benefit of U.S. Provisional Application No. 62/529,959 titled "Saccadic Redirection for Virtual Reality Locomotion," filed Jul. 7, 2017, the entire contents of which is incorporated herein by reference.

FIELD OF THE INVENTION

The present invention relates to virtual reality, and more specifically, to computing a path for a user to move along within a physical space while viewing a virtual environment.

BACKGROUND

Conventional off-the-shelf virtual reality head-mounted displays support room-scale position tracking for a natural locomotion experience. However, physical spaces, usually small rooms inside end users' homes and video game arcades, are typically smaller than virtual spaces. A major challenge for virtual reality (VR) is embedding a large virtual space within a small, irregular, multi-user physical space while minimizing interruptions. The ideal solution would create the perception of infinite walking in the virtual space within a small, finite physical space. Treadmills or other physical devices can address the infinite walking problem but are undesirable for general applications because they are expensive, bulky, and can compromise the user's balance, while also preventing free user movements such as kneeling and jumping. Moreover, while using physical devices like these, acceleration and deceleration effects of natural walking are not felt, which can cause discomfort.

A straightforward solution to the problem of a limited physical space is to reset the virtual orientation whenever users hit the physical boundaries/obstacles of their room. Unfortunately, for large virtual environments, the viewpoints need to be reset often, which interrupts and degrades the quality of the user experience. An alternative to simply resetting the virtual orientation, is to redirect the user to avoid the physical boundaries/obstacles. Redirected walking techniques can enhance the immersion and visual-vestibular comfort of VR navigation, but are often limited by the size, shape, and content of the physical environments. The goal of redirection is to dynamically and imperceptibly manipulate a virtual environment to minimize how often a user hits boundaries of the room or an obstacle like furniture.

A first technique for redirecting a user increases rotation/transformation gains when the user rotates and/or moves his or her head, such that it causes the degree of head rotation visually perceived by the user to be slightly different from the actual rotation of their head. However, the head movement and the amount of redirection that may be achieved without negatively impacting the user's experience must be limited. A second technique for redirecting a user warps scene geometry so that the user's movements are guided through modified, re-rendered scenes. For example, the second technique may cause a straight hallway to appear curved to prevent the user from walking into a boundary or an obstacle. Warping causes distortion and is not suitable for open spaces within scenes. There is a need for addressing these issues and/or other issues associated with the prior art.

SUMMARY

A method, computer readable medium, and system are disclosed for computing a path for a user to move along within a physical space while viewing a virtual environment in a virtual reality system. A path for a user to physically move along through the virtual environment is determined based on waypoints and at least one characteristic of a physical environment within which the user is positioned, position data for the user is received indicating whether and how much a current path taken by the user has deviated from the path, and an updated path is computed through the virtual environment based on the waypoints and the at least one characteristic of the physical environment.

BRIEF DESCRIPTION OF THE DRAWINGS

FIG. 2E illustrates pseudo-code for static-dynamic path planning and locomotive redirection, in accordance with an embodiment.

DETAILED DESCRIPTION

Redirected locomotion enables realistic virtual reality experiences in a physical space that is smaller compared with the virtual environment or that includes obstacles. A technique for detecting a naturally occurring visual suppression event when a user's eyes make a rapid movement relative to their head is described. Once the visual suppression event is detected, the user's path may be redirected using a variety of techniques. Redirection or reorientation is a technique that modifies the user's virtual camera to decrease the likelihood of exiting a physical space or of hitting a physical obstacle (e.g. furniture). Since minor changes in the virtual camera during a visual suppression event are generally imperceptible, modifying the virtual camera position helps provide richer experiences without the user noticing the redirection. The user's path through a virtual space is redirected so the user remains within a physical space. Conventionally, the user's path is redirected only when the user's head rotates and visual suppression events are not considered. As described further herein, the virtual camera may be reoriented not only when the user's head rotates, but also during, and slightly after, visual suppression events when the user's eyes move rapidly relative to their head, even when the head does not rotate—providing opportunities for introducing more frequent and greater amounts of redirection.

Figure 1A:
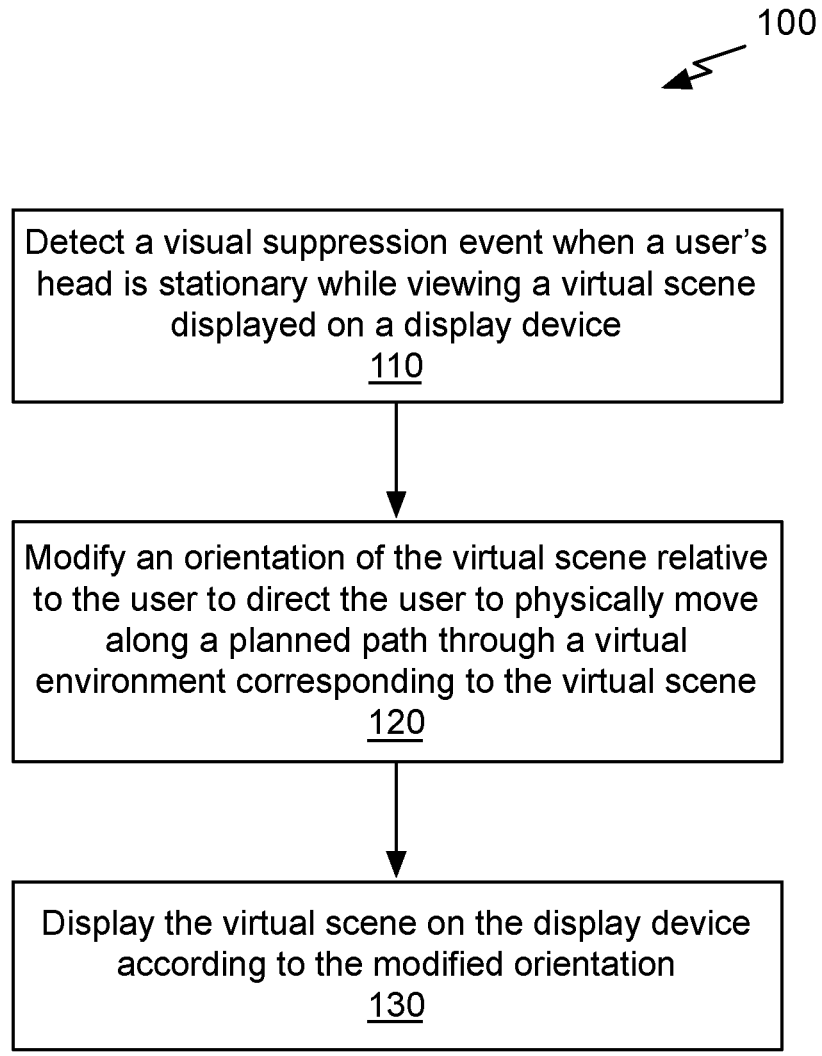
FIG. 1A illustrates a flowchart of a method for locomotive redirection during a temporary visual suppression event, in accordance with an embodiment.

FIG. 1A illustrates a flowchart of a method 100 for locomotive redirection during a temporary visual suppression event, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of detecting a visual suppression event. Furthermore, persons of ordinary skill in the art will understand that any system that performs method 100 is within the scope and spirit of embodiments of the present invention.

At step 110, a visual suppression event is detected when a user's eyes move relative to their head, while viewing a virtual scene displayed on a display device. For example, a visual suppression event occurs when the user's eyes rapidly rotate relative to their head. The user's head may rotate during the head movement or the user's head may be stationary. In the context of the following description, a user's eyes move "rapidly" when his or her eyes rotate at least 100°/sec relative to his or her head (rotating with or against the direction of head movement). One example of a visual suppression event is a saccadic suppression—the phenomenon where humans experience temporary blindness during rapid eye movements when we change fixation points. Saccades occur frequently, but human's high-level visual system prevents conscious awareness of the blindness. The visual system also recalibrates its orientation after a saccade on the assumption that the world itself has not changed. During normal viewing, saccades occur several times a second and contain extremely fast motion (up to 900°/sec).

A duration of the visual suppression event begins before the saccade begins and extends for an additional duration after the saccade has ended, during which the human visual system temporarily loses visual sensitivity. A time duration of the eye motion during a saccade may be long (20-200 ms) compared to VR frame durations (10-20 ms). Due to the temporary blindness, small changes in the virtual scene orientation during saccades are imperceptible, and hence can be used for effective redirected walking. Saccades are among many behaviors that trigger temporary perceptual suppression. Other examples of visual suppression events include masking by patterns (in which presence of particular visual patterns suppress our ability to visually process a scene e.g. a zebra's stripes make individuals hard to distinguish from the herd), flash suppression (in which a flash of an image presented to one eye causes another image presented to the other eye to be suppressed), tactile saccades (in which our ability to perceive surfaces by touching them is suppressed due to motion), and blinking (visual suppression during and after blinks). Gaze tracking (or other techniques e.g. electroencephalographic recording) may be used to detect a visual suppression event. In an embodiment, an eye-tracked head-mounted display device is configured to track a gaze location of a virtual reality user to identify when a visual suppression event occurs.

At step 120, an orientation of the virtual scene relative to the user is modified during the visual suppression event to direct the user to physically move along a planned path through a virtual environment corresponding to the virtual scene. For example, the orientation (translation and/or rotation) of the virtual scene may be modified to redirect the user to a desired path that ensures the user does not collide with obstacles in the physical environment and is directed towards waypoints in the virtual environment. In an embodiment, to redirect a user's walking direction, a rotation centered on the user's current position in virtual space is applied to the virtual scene during a visual suppression event. In an embodiment, redirection may be used to avoid static and/or dynamic obstacles. Compared with conventional redirection techniques, faithful visual and vestibular experiences are retained across a broader range of virtual and physical spaces.

At step 130, the virtual scene is displayed on the display device according to the modified orientation. When the visual suppression events are not occurring as frequently as needed to redirect the user, a subtle gaze direction event may be inserted into the virtual scene to encourage a saccadic action. The gaze direction event provides a visual distraction in a periphery of the user's vision to induce a saccade. Importantly, in an embodiment, the gaze direction event is performed at display time and does not affect rendering or contents of the virtual scene.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
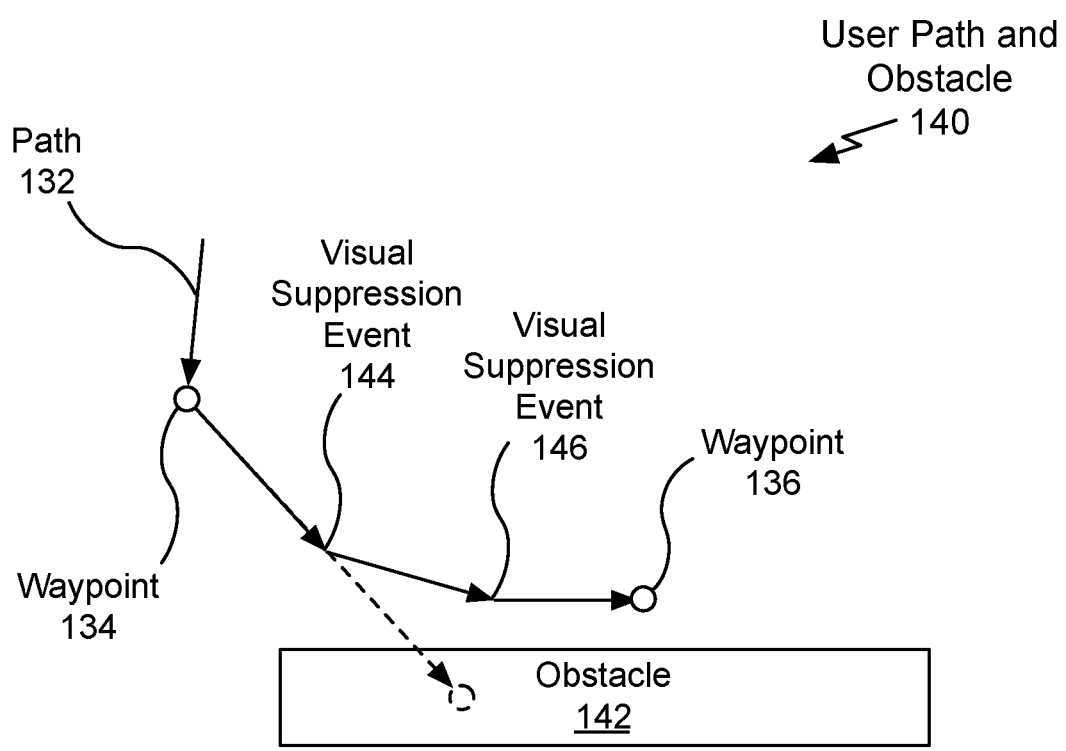
FIG. 1B illustrates a user path and obstacle, in accordance with an embodiment.

FIG. 1B illustrates a user path and obstacle 140, in accordance with an embodiment. Two waypoints 134 and 136 are intersected by a path 132. Each visual suppression event 144 and 146 provides an opportunity to redirect the user's walking direction. During the visual suppression events 144 and 146 a rotation, centered on the user's current position in virtual space (i.e., the virtual environment), may be applied to the virtual scene. The rotation may direct the user along the path 132 toward the waypoint 136 while ensuring the user avoids an obstacle 142. The obstacle 142 may be at a fixed location or may be moving (i.e., dynamic).

At each time t, suppose the gaze positions of current/last frame displayed to the user are $p_t/p_{t+\Delta t}$. In an embodiment, visual suppression events 144 and 146 are identified when the rate of gaze position change is faster than a saccadic threshold value in degrees of rotation per second. In an embodiment, the saccadic threshold value is 200°/sec. The saccadic threshold value may be fixed, computed, or programmed. In the context of the following description, a rate of gaze position change that is faster than a saccadic threshold value is considered a rapid eye movement. The rapid eye movement may occur when the user's head is stationary or while the user's head is rotating. Importantly, the rate of rotation during a visual suppression event is the rate of rotation of the user's eyes relative to the user's head.

A directional manipulation is applied to the virtual scene (i.e., a camera position is rotated relative to the user's position in the virtual scene) when visual suppression events 144 and 146 are detected. In an embodiment, a user does not detect a camera rotation of less than 12.6°/sec (0.14° at 90 frames per second) when their gaze velocity is above 180°/sec. A redirection rotational value by which the camera is rotated may be fixed, computed, or programmed. In an embodiment, the camera rotation may be increased linearly for longer visual suppression events. Importantly, the virtual scene is not warped. Instead, in an embodiment, the camera position is rotated without translation, in contrast with traditional redirection techniques.

When a user quickly rotates his or her head by a head rotation threshold value (e.g., 10°/sec), a higher rotation gain (e.g., 45°/sec) may be applied to the virtual scene compared with when a visual suppression event is detected. Thus, redirected walking based on visual suppression events is orthogonal to traditional redirected walking based only on head rotations—and the two techniques may be used together.

When opportunities to redirect a user's gaze are not occurring frequently enough to redirect the user's path to avoid the physical obstacles, a visual suppression event may be induced. One or more of the visual suppression events 144 and 146 may be induced visual suppression events. Subtle gaze direction (SGD) may be used to direct a viewer's gaze to a specific target to induce a visual suppression event. When applied in peripheral regions, an SGD event can direct the user's attention without affecting net perception of the scene. SGD events may be generated to dynamically and subtly increase the frequency of visual suppression events, creating more opportunities for imperceptible rotation of the virtual environment. In contrast with traditional subtle gaze direction techniques that modify the virtual environment in virtual space, an SGD event may be generated in image space without modifying the virtual environment that is rendered. Instead, one or more pixels in the rendered frame of a scene of the virtual environment are modified. Introducing the SGD event in image space reduces the latency from when the SGD event is initiated to when the SGD event is visible to the user.

In an embodiment, temporal modulations are applied to pixels in a user's visual periphery to generate an SGD event. To improve the effectiveness of the modulations, a content-aware approach prioritizes high-contrast image regions for stimulus placement. Searching for pixels with high local contrast can be an expensive per-frame computation. In an embodiment, for acceleration, contrast of the rendered image is computed on a down-sampled version of the current frame. In an embodiment, the down-sampled version is obtained by generating "multim in parvo" texture maps (i.e., MIPMAPs) for the current frame. After estimating and finding the region with maximum local contrast, the SGD stimulus is generated by modulating the luminance of a Gaussian-shaped region around the center of the high-contrast region including one or more pixels. An example algorithm that may be used to search for the high-contrast region in a down-sampled version of the rendered frame is shown in TABLE 1.

TABLE 1

| | |
|---|---|
| 1: | I: current frame (rendered, but not displayed) |
| 2: | function IMAGESPACESGD(I) |
| 3: |     Compute MIPMAPs for I |
| 4: |     Select the 5th MIPMAP image $I_5$ |
| 5: |     Compute the local Weber contrast for each 3 × 3 tile in $I_5$ |
| 6: |     Find peripheral pixel $p_5^{max} \in I_5$ with max local contrast |
| 7: |     Locate the tile $t_{max}$ in I corresponding to $p_5^{max}$ |
| 8: |     Perform SGD modulation centered at $t_{max}$ |
| 9: | end function |

Figure 1C:
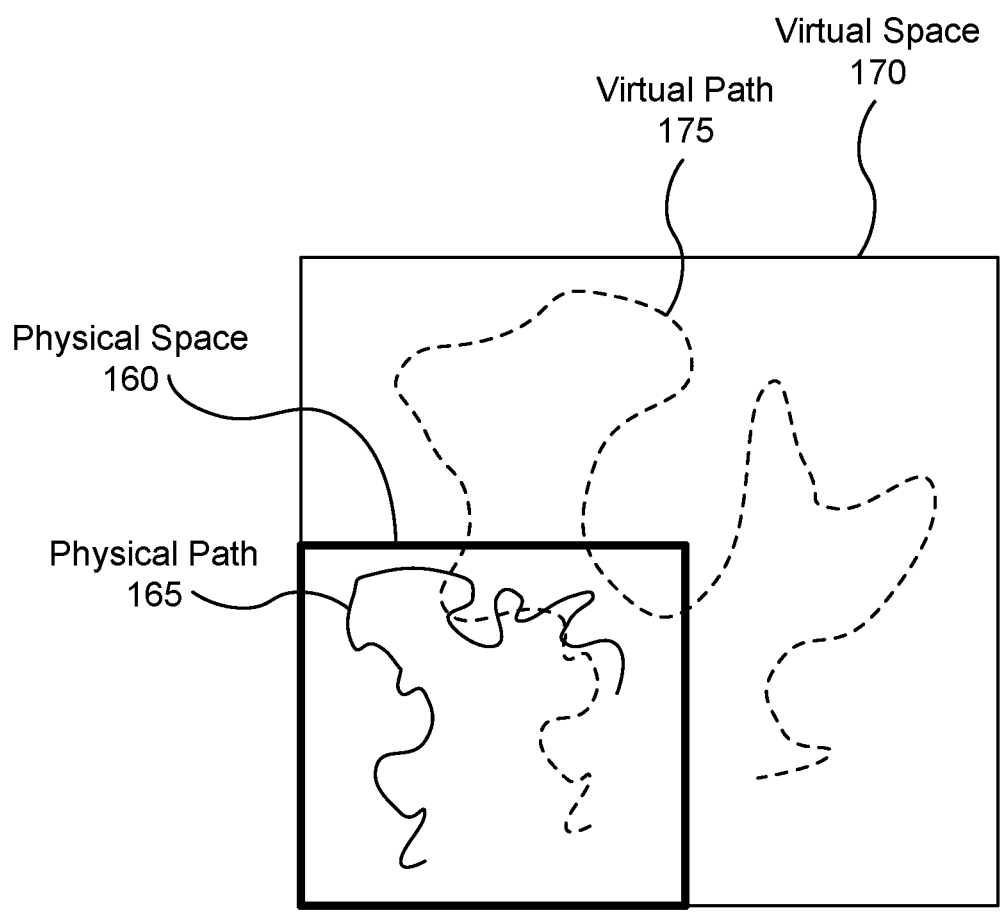
FIG. 1C illustrates a diagram of a user's path in a physical space and virtual space, in accordance with an embodiment.

FIG. 1C illustrates a diagram of a user's path in a physical space 160 and virtual space 170, in accordance with an embodiment. The physical path 165 of the user is constrained to remain within the physical environment or physical space 160. However, the user perceives that he or she travels along the virtual path 175 in the virtual environment or virtual space 170. In an embodiment, the method 100 provides a dynamic solution to the infinite walking problem and is effective for physical areas as small as 12.25 m². The area of 12.25 m² matches the recommended consumer HMD room-scale installation bounds. Redirecting a user during visual suppression events caused by eye movements relative to head position as well as for eye movements resulting from head rotations, enables more aggressive redirection because there are more opportunities to redirect the user.

Figure 1D:
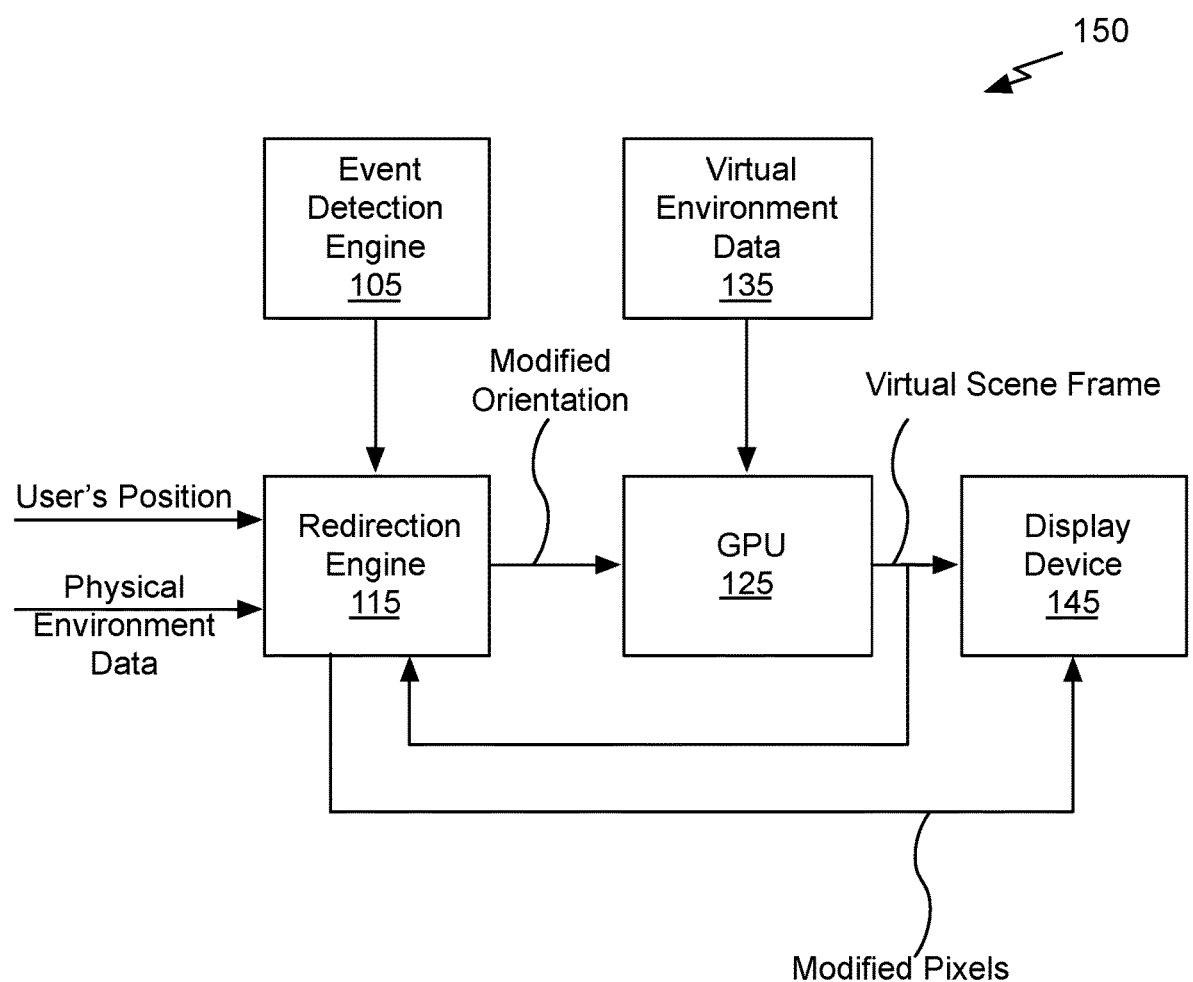
FIG. 1D illustrates a block diagram of a virtual reality system, in accordance with an embodiment.

FIG. 1D illustrates a block diagram of a virtual reality system 150, in accordance with an embodiment. The efficacy of redirection during visual suppression events depends on several factors, including frequency and duration of visual suppression events, perceptual tolerance of image displacement during visual suppression events, and the eye-tracking-to-display latency of the system 150.

The virtual reality system 150 includes an event detection engine 105, a redirection engine 115, a GPU 125, virtual environment data 135, and a display device 145. In an embodiment, the event detection engine 105 is an eye tracking device. In an embodiment, the eye tracking device is calibrated to each user. In an embodiment, the event detection engine 105 implements a heuristic to detect visual suppression events. At the beginning of each frame, the previous two gaze samples are used to estimate the current angular velocity of the user's gaze. If the angular velocity is greater than 180°/sec, a visual suppression event is either currently ongoing or has recently finished. Gaze samples may be acquired by the event detection engine 105 at least once per frame. In an embodiment, the average position of the user's left and right gaze locations is used for each gaze sample to help reduce noise in detecting location and in estimating velocity.

Due to the latency of contemporary eye-trackers as well as VR rendering and display pipelines, detection of a visual suppression event generally lags actual visual suppression event by tens of milliseconds. However, since the duration of a visual suppression event ranges from 20-200 ms and visual suppression lasts for 100 ms after a visual suppression event begins, detection is relatively tolerant of tracking and rendering latency, especially for visual suppression events with large angular amplitude.

In an embodiment, when a visual suppression event is detected within a frame, the redirection engine 115 slightly reorients the virtual camera by a rotational value. In an embodiment, the rotational value is 0.14°/frame. The modified orientation of the virtual camera is provided to the GPU 125 for rendering the reoriented scene of the virtual environment for the next frame. As previously explained, redirection for visual suppression events can be combined with redirection for head-only reorientation. Although rotation during head movement allows for a greater amount of redirection, large head rotations are less frequent than visual suppression events, so an overall improvement in redirected walking is expected when redirection is performed for both visual suppression events and head-only movements.

To guide users away from both stationary and moving obstacles, the redirection engine 115 must dynamically compute the virtual camera orientation in each frame. Existing off-line mapping approaches require pre-processing that is not performed at interactive speeds and, is therefore incompatible with visual suppression events that happen dynamically and unpredictably in real time. Additionally, in an embodiment, visual distortion caused by virtual scene warping is avoided by only applying rigid virtual camera transformations (i.e., rotations) to redirect the user.

The GPU 125 renders the virtual scene frame based on the virtual environment data 135 and a position of the virtual camera provided by the redirection engine 115. In an embodiment, the virtual environment data 135 is stored in a memory that can be accessed by the GPU 125. At least a portion of the virtual environment data 135 may be cached within the GPU 125. Each virtual scene frame rendered by the GPU 125 is output and displayed at the display device 145. In an embodiment, the GPU 125 generates an image pair of the virtual scene for stereoscopic viewing on a stereoscopic display device 145. In an embodiment, the virtual scene frame is stored in a memory that can be accessed by one or more of the GPU 125, the redirection engine 115, and the display device 145.

The redirection engine 115 may also be configured to generate SGD events to induce visual suppression events. The redirection engine 115 may perform object-space SGD as luminance modulations on the diffuse textures or materials of specific scene objects. In general, a salient object is selected as the target of SGD. In an embodiment, a set of target objects are selected in virtual space based on the user's gaze and a distance from the user's virtual viewpoint to each object and SGD objects are selected from the set of target objects. When object-space SGD is performed, the redirection engine 115 provides modified object attributes to the GPU 125. In contrast, when the redirection engine 115 is configured to perform image-space SGD, the redirection engine 115 processes the virtual scene frame to identify the region of the virtual scene frame having a maximum local contrast and then modifies one or more pixels in the region. In an embodiment, the one or more pixels are modified to implement contrast-based subtle gaze direction in a periphery area of the user's gaze.

Static-Dynamic Path Planning for Virtual Reality Locomotion

A second component that may improve the user experience for virtual reality locomotion is a static-dynamic path planner. A content-aware path planner may adapt to dynamic environmental changes and generate a path that directs the user away from static and dynamic obstacles. Initially, a static path is planned for the user based on waypoints in the scene. The planned path is computed for the user to avoid static obstacles in the physical environment, such as walls and furniture. As the user and/or obstacles move within the physical environment, the planned path is updated. As the user moves within the physical environment, locomotion of the user is redirected so that the user's actual path converges with the planned path. As previously explained, the user's actual path is redirected during visual suppression events.

Figure 2A:
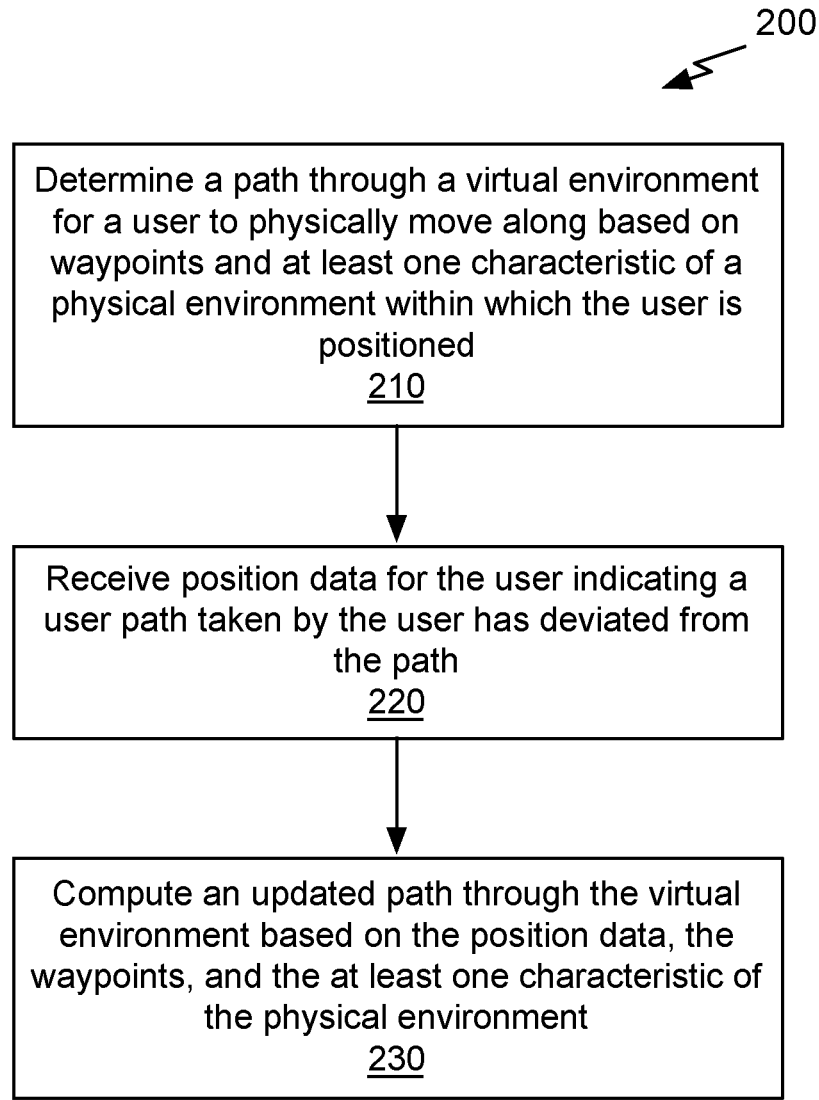
FIG. 2A illustrates a flowchart of a method for static-dynamic path planning for locomotion through a virtual environment, in accordance with an embodiment.

FIG. 2A illustrates a flowchart of a method 200 for static-dynamic path planning for VR locomotion, in accordance with an embodiment. Although method 200 is described in the context of a processing unit, the method 200 may also be performed by a program, custom circuitry, or by a combination of custom circuitry and a program. For example, the method 200 may be executed by a GPU (graphics processing unit), CPU (central processing unit), or any processor capable of performing static-dynamic path planning. Furthermore, persons of ordinary skill in the art will understand that any system that performs method 200 is within the scope and spirit of embodiments of the present invention.

At step 210, a path through a virtual environment is determined for a user to physically move along. The path is determined based on waypoints and at least one characteristic of a physical environment within which the user is positioned. In the context of the following description, a characteristic of the physical environment may include physical barriers (e.g., walls, floors, etc.) and static and dynamic objects (e.g., furniture, fixtures, animals, trees, people, etc.) in the physical environment.

At step 220, position data is received for the user indicating a current path taken by the user has deviated from the path. In the context of the following description, position data for the user may include coordinates within the physical environment and/or the virtual environment corresponding to one or more locations on or in close proximity to the user. In an embodiment, position data may also be received for any dynamic obstacles in the physical environment.

At step 230, an updated path through the virtual environment is computed based on the waypoints and the at least one characteristic of the physical environment. In an embodiment, the user is redirected to travel along the updated path. In an embodiment, a visual suppression event is induced to provide an opportunity to redirect the user. In another embodiment, redirection occurs when a visual suppression event or a head-only movement is detected.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2B:
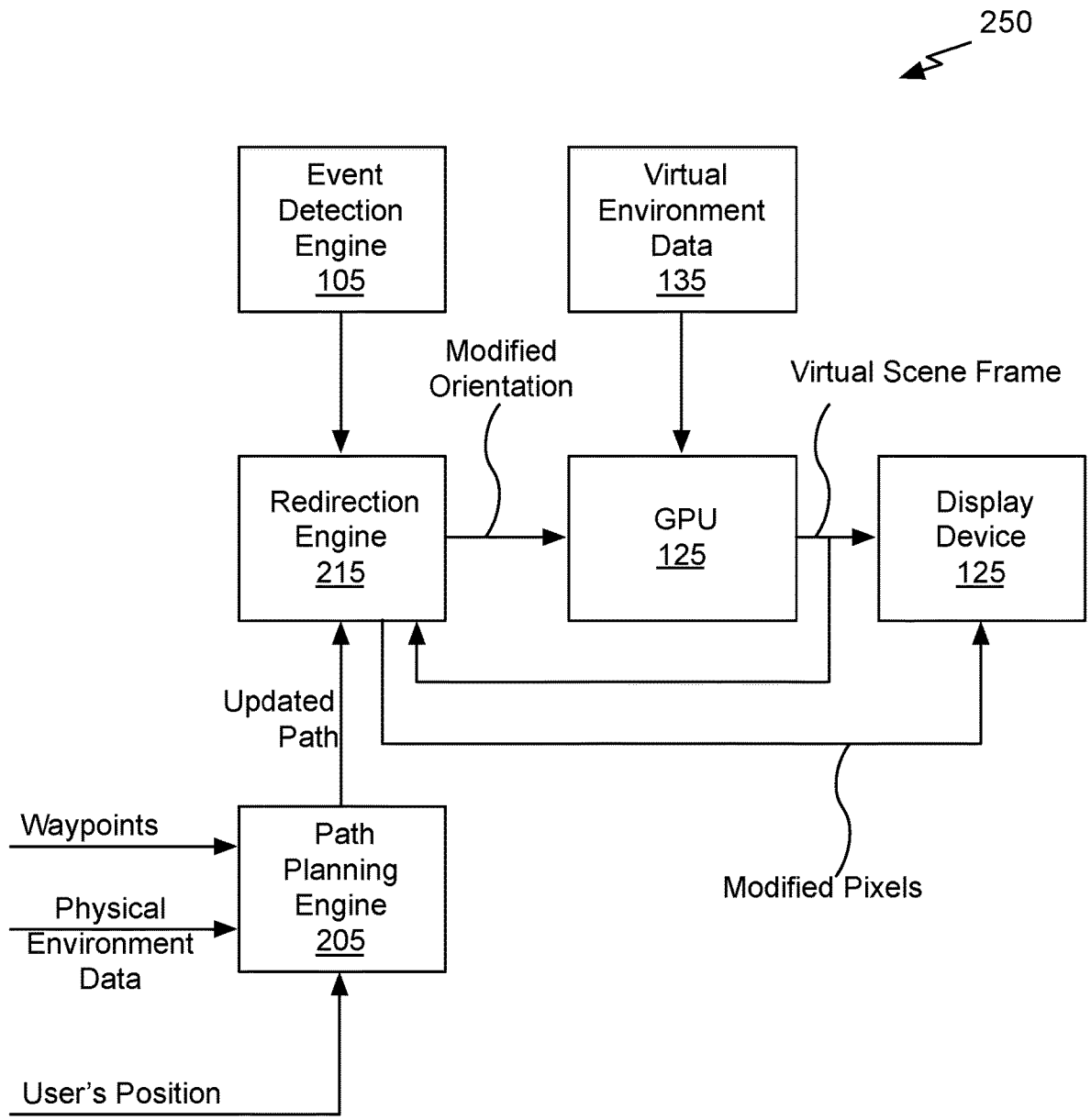
FIG. 2B illustrates another block diagram of a virtual reality system, in accordance with an embodiment.

FIG. 2B illustrates a block diagram of a virtual reality system 250, in accordance with an embodiment. Redirecting the user through camera manipulation and SGD enables the user to experience the virtual environment. To guide users away from both stationary and moving obstacles, the system 250 dynamically updates the path and computes the virtual camera orientation in each frame, modifying the orientation as needed for redirection. The real-time dynamic path planning approach is driven by perceptual factors (e.g., SGD), characteristics of the physical environment, and GPU parallelization.

The virtual reality system 250 includes the event detection engine 105, a redirection engine 215, a path planning engine 205, the GPU 125, virtual environment data 135, and the display device 145. In an embodiment, when a visual suppression event is detected, the redirection engine 215 modifies the scene orientation according to a static-dynamic path planner implemented by the path planning engine 205. While the redirection engine 115 computes the modified orientation based on a redirection rotation value, the user's position, and physical environment data, the redirection engine 215 computes the modified orientation based on a redirection rotation value, the user's position, and physical environment data, and the location of at least one waypoint on the updated path. The GPU 125 renders the virtual scene frame based on the virtual environment data 135 and a modified orientation of the virtual camera provided by the redirection engine 215.

For a given frame t and a 2D virtual position x=(x, y) the corresponding physical position u=(u, v) may be modeled using an affine transformation M between the virtual and physical spaces:

$$u(x,t)=M(t)(x-x_C(t))+x_C(t)$$

$$M[R|T] \quad (1)$$

Where $x_C(t)$ is the user's current virtual space position. The formulation in equation (1) interprets x and u as the next virtual and real user positions to allow optimization for the near future to avoid obstacles.

The goal of the real-time path planner is to find the next frame's optimal translation T(t+1) and rotation R(t+1) components of the modified orientation so that the redirected walking path during visual suppression events can guide users away from static and dynamic physical obstacles. In some situations, R has been found to be much more effective than T with visual suppression events and head rotations, so, in an embodiment, T(t) is set to zero to reduce the real-time, multidimensional computation workload:

$$M(t+1) \leftarrow \begin{bmatrix} \cos(\Delta\theta(t)) & -\sin(\Delta\theta(t)) \\ \sin(\Delta\theta(4)) & \cos(\Delta\theta(t)) \end{bmatrix} M(t) \quad (2)$$

where the redirection angle $\Delta\theta$ is optimized.

Figure 2C:
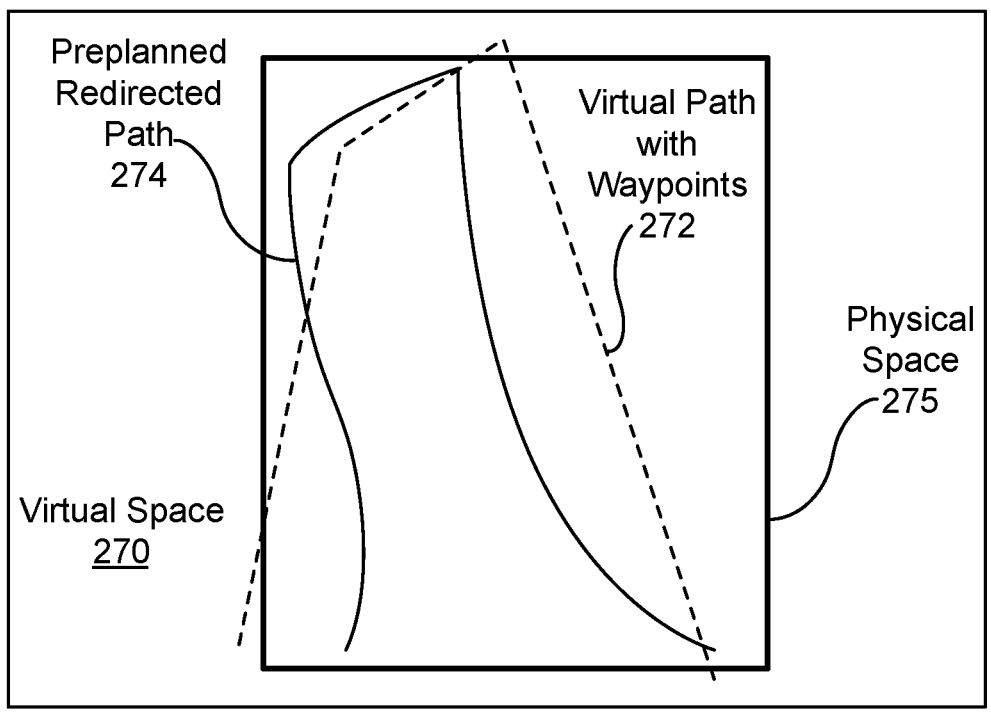
FIG. 2C illustrates static-dynamic path planning, in accordance with an embodiment.
Figure 2C:
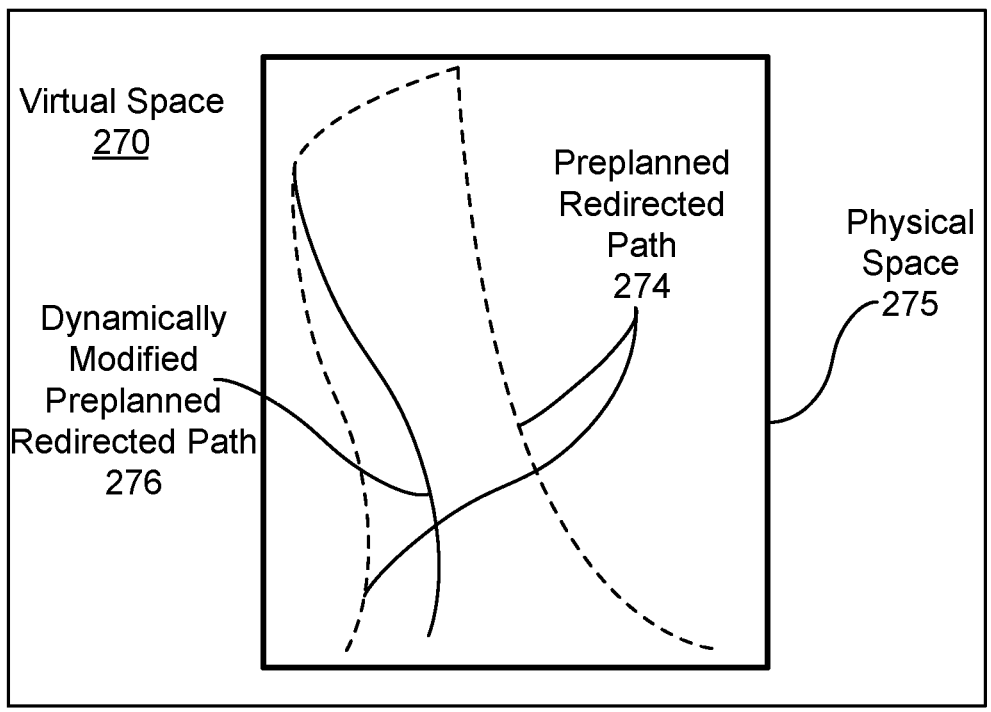

FIG. 2C illustrates static-dynamic path planning, in accordance with an embodiment. In an embodiment, a searching task is defined where users are expected to find and walk through a pre-defined sequence of waypoints in a virtual space 270. A virtual path with waypoints 272 is a static path through a pre-defined sequence of waypoints. A preplanned redirected path 274 avoids obstacles in the physical space 275 while also taking the user through the pre-defined sequence of waypoints (the waypoints are positioned in virtual space).

For each frame, an optimized walking direction (θ) is modeled as a radius-based function (RBF) of time (t):

$$\theta(t) = \sum_i C_i e^{-(t-t_i)^2/g}$$

where $t_i$ is the i-th temporally sampled node, g is a standard Gaussian derivation, and $C_i$ are RBF parameters for proper estimation. Thus, the velocity (v(t)) is $$v(t)=[\tilde{v}\cos(\theta),\tilde{v}\sin(\theta)]$$

Where $\tilde{v}$ is the average speed of finishing the original tasks (i.e., reaching the waypoints) without redirection.

In practice, users may not follow the preplanned redirected path 274, therefore a dynamic correction procedure may be implemented:

$$\Theta(t,\bar{t},\bar{\alpha})=\theta(t)+\theta(\bar{t},\bar{\alpha}).$$

where $(\bar{t},\bar{\alpha})$ describes the polar coordinate of the user's eccentricity of the preplanned redirected path 274 at time E. A learning process may be applied by sampling a large number of $(\bar{t},\bar{\alpha})$ pairs. In a real-time virtual reality application, given users' eccentric values, the sampled $(\bar{t},\bar{\alpha})$ pairs can either be fitted to a new basis function or bilinear interpolation may be applied among the closest sampled values. Importantly, the dynamically modified preplanned redirected path 276 causes the user to avoid obstacles in the physical space 275 while also limiting the redirection between frames to not exceed the redirection rotational value.

In an embodiment, only rigid rotation from the optimized $\Delta\theta(t)$ is applied during visual suppression events and head rotations. The computation is easier compared with warping-based techniques because a distortion energy term is not used. Note that the perceptually unnoticeable angular gain from a visual suppression event is limited to $[-\Delta\theta_{max}, \Delta\theta_{max}]$, where $\Delta\theta_{max}$ is 12.6°/sec. To match the 12.6°/sec constraint while obtaining real-time performance responding to users' dynamic visual suppression events, the optimization may be implemented as a GPU-based line searching method. With the optimized $\Delta\theta$, the virtual camera is redirected according to the modified orientation computed by the redirection engine 215 when visual suppression events and/or head rotations are detected by the event detection engine 105.

Figure 2D:
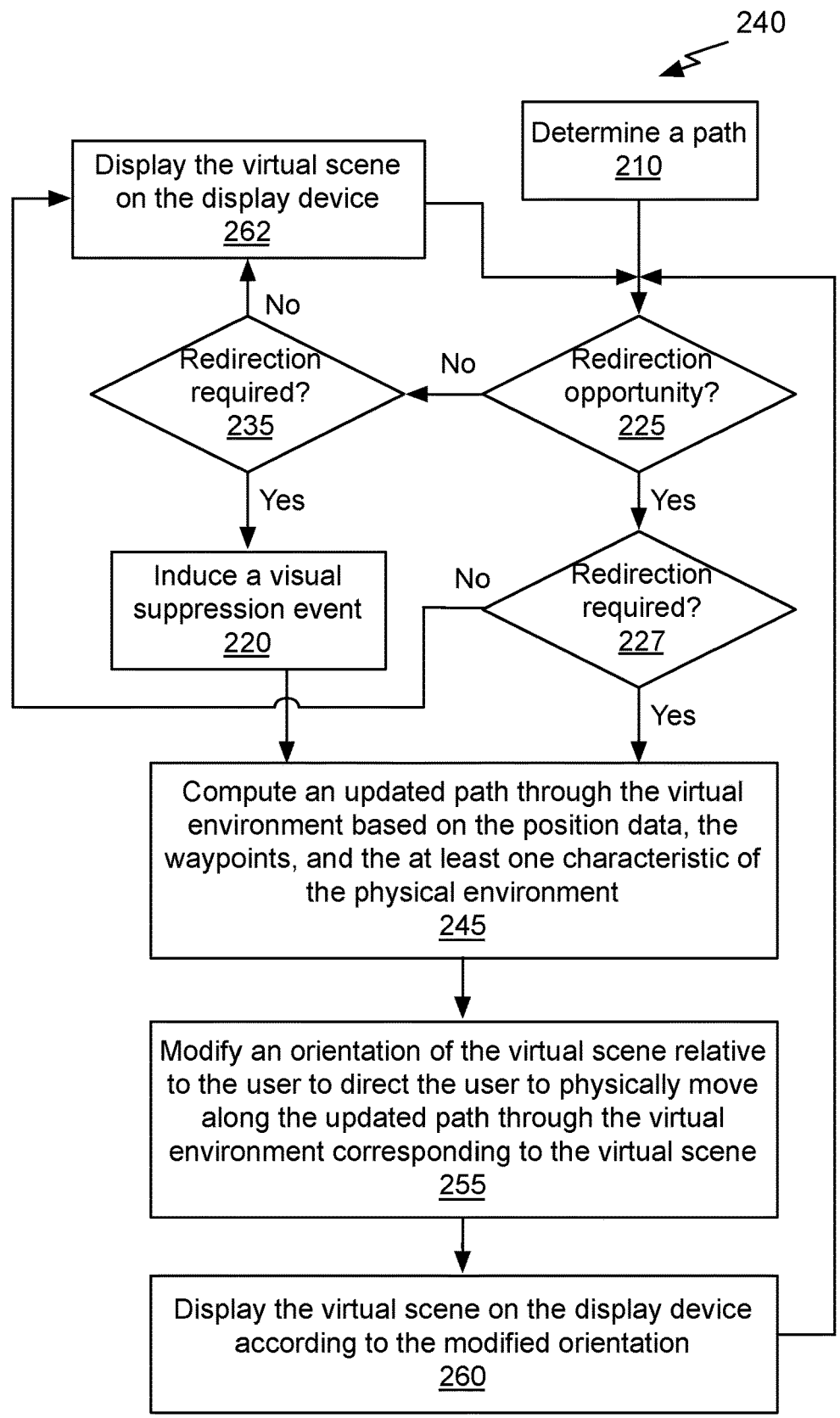
FIG. 2D illustrates another flowchart of a method for static-dynamic path planning and locomotive redirection, in accordance with an embodiment.

FIG. 2D illustrates another flowchart of a method 240 for static-dynamic path planning and locomotive redirection, in accordance with an embodiment. Although method 240 is described in the context of a processing unit, the method 240 may also be performed by a program, custom circuitry, or by a combination of custom circuitry and a program. For example, the method 240 may be executed by a GPU, CPU (central processing unit), or any processor capable of performing static-dynamic path planning. Furthermore, persons of ordinary skill in the art will understand that any system that performs method 240 is within the scope and spirit of embodiments of the present invention.

At step 210, the path planning engine 205 determines a path through a virtual environment for a user to physically move along. At step 225, the redirection engine 215 determines if a redirection opportunity has occurred. A redirection opportunity results from detection of a visual suppression event by the event detection engine 105. If a redirection opportunity has not occurred at step 225, then at step 235, the redirection engine 215 determines if redirection is required. Redirection may be required if a collision between the user and an obstacle is imminent, if the user has strayed by more than a predetermined amount from the planned path, or if a predetermined duration of time has passed since a redirection was applied. If, at step 235, the redirection engine 215 determines that redirection is not required, then at step 262 the virtual scene is displayed on the display device. The virtual scene may be rendered by the GPU 125 based on the current camera orientation without applying redirection.

If, at step 225, a redirection opportunity has occurred, then at step 227, the redirection engine 215 determines if redirection is required. If, at step 227, the redirection engine 215 determines that redirection is not required, then at step 262 the virtual scene is displayed on the display device. Otherwise at step 227, when redirection is required, then at step 245, the path planning engine 205 computes an updated path based on waypoints, physical environment data, and the user's position.

If, at step 235 the redirection engine 215 determines redirection is required, then, at step 220, the redirection engine 215 induces a visual suppression event. The redirection engine 215 may generate an SGD event to induce a visual suppression event. In an embodiment, the path planning engine 205 periodically computes an updated path regardless of whether or not redirection is required. In an embodiment, the path planning engine 205 computes an updated path whenever the user strays a threshold distance from the planned path.

At step 245, the redirection engine 215 modifies an orientation of the virtual scene relative to the user to direct the user to physically move along the updated planned path through a virtual environment corresponding to the virtual scene. At step 260, the virtual scene is displayed on the display device according to the modified orientation before returning to step 225.

FIG. 2E illustrates pseudo-code for static-dynamic path planning and locomotive redirection, in accordance with an embodiment. Redirection and dynamic path planning are performed before each frame. First, a visual suppression event is detected and the acceptable perceptual thresholds for virtual camera redirection (i.e., redirection rotational value) are determined. Then, the path planning optimization is performed. In an embodiment, for each frame, the current and previous gaze orientations are used to detect visual suppression events, identifying opportunities for redirection. If the current frame is a candidate for redirection, either due to an ongoing visual suppression event or head rotation, the camera viewpoint may be oriented in the direction of desired redirection by a magnitude subject to human perceptual limits.

As shown in FIG. 2E, visual suppression events are detected and path correction is performed by applying a modified orientation for the virtual camera. In lines 1 through 5 changes in head rotation and gaze direction is measured to detect visual suppression events in lines 8 through 10, and a maximum gaze-based redirection angle $\Gamma_G$ is estimated. In lines 15 and 16, a maximum head-rotation-based redirection angle $\Gamma_H$ is measured.

Path planning and correction is performed in lines 11 through 14 by first determining $\alpha$, the deviation from the preplanned path and computing $\Delta_\theta$, the rotational difference between the user's current direction and the direction of the preplanned path. A rotational adjustment value $\lambda$ is determined (at line 15) based on a comparison between the signs of the change in head rotation and the rotational difference. The rotational adjustment value is used to compute the maximum head-rotation-based redirection angle $\Gamma_H$ and update $\Delta_\theta$ (in lines 16 and 17) to compute a modified virtual camera orientation in line 18. During rendering based on the updated virtual camera orientation, object-space SGD may be applied to induce a visual suppression event in line 19. After rendering in line 20, image-space SGD may be performed to induce a visual suppression event in line 21.

Redirecting a user during visual suppression events can significantly increase the rotation gains during redirection without introducing visual distortions or simulator sickness. Therefore, the methods 100, 200, and 240 are particularly applicable to large open virtual spaces and small physical environments for room-scale VR with static and/or dynamic obstacles.

Parallel Processing Architecture

Figure 3:
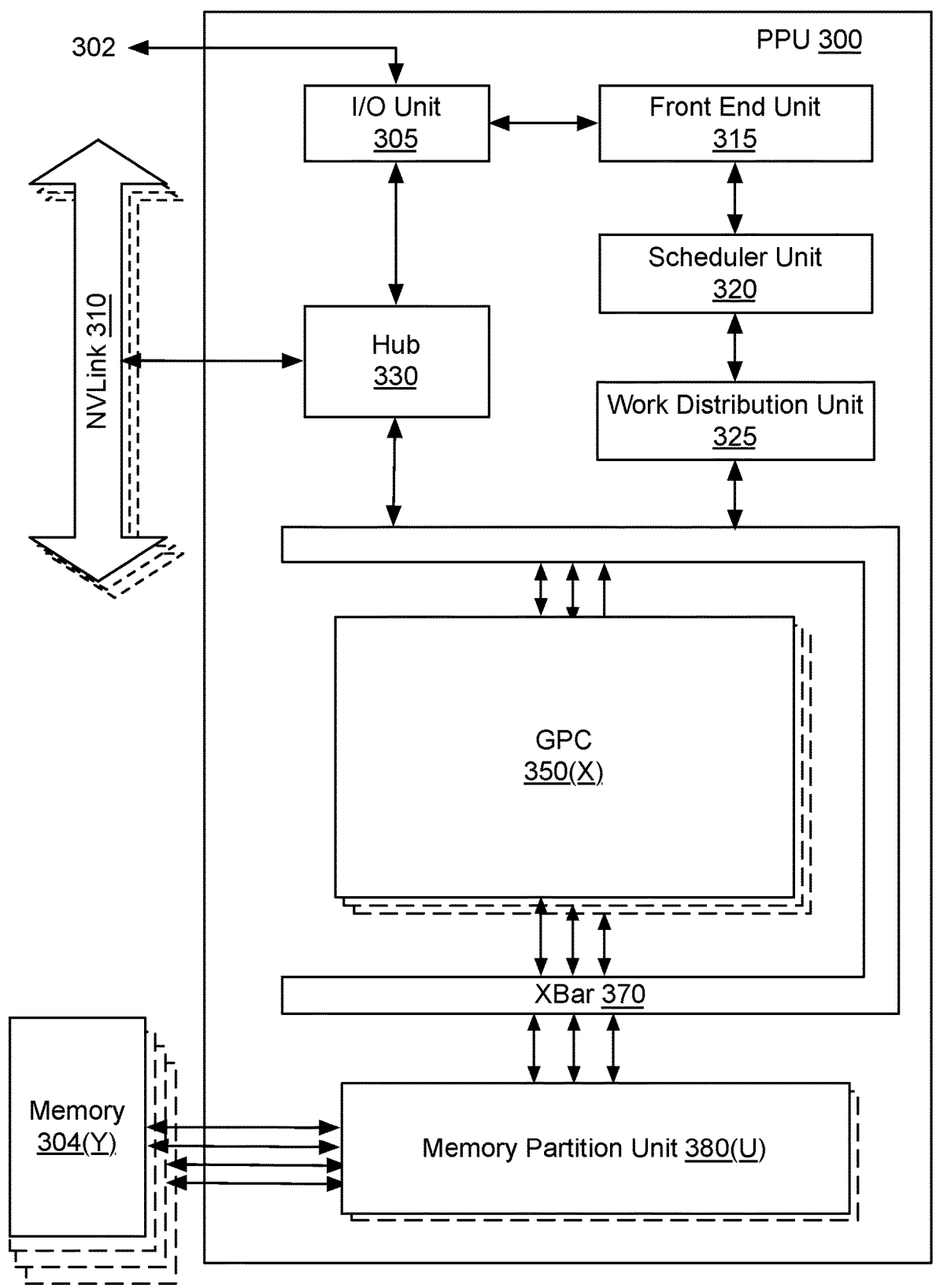
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
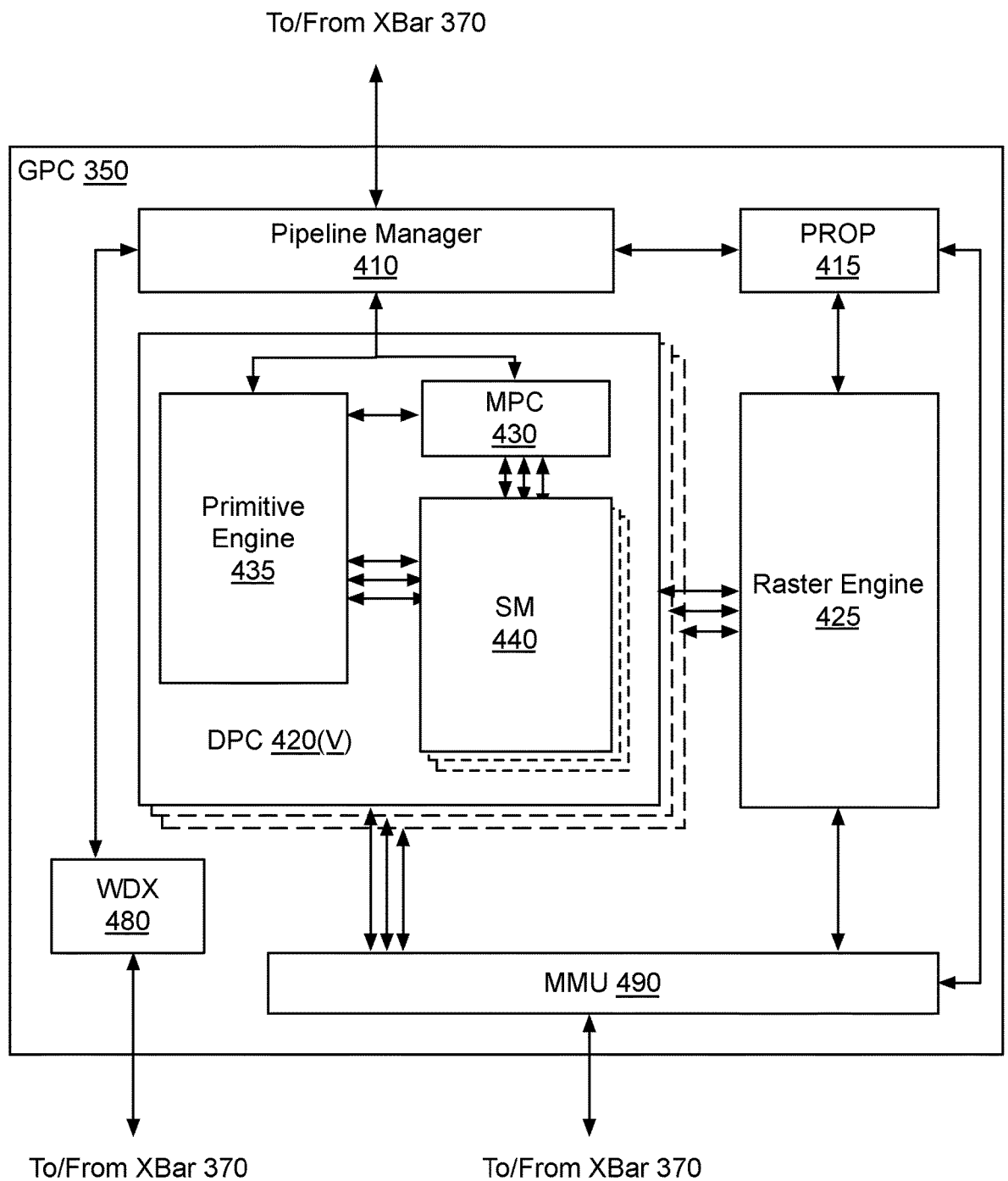
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
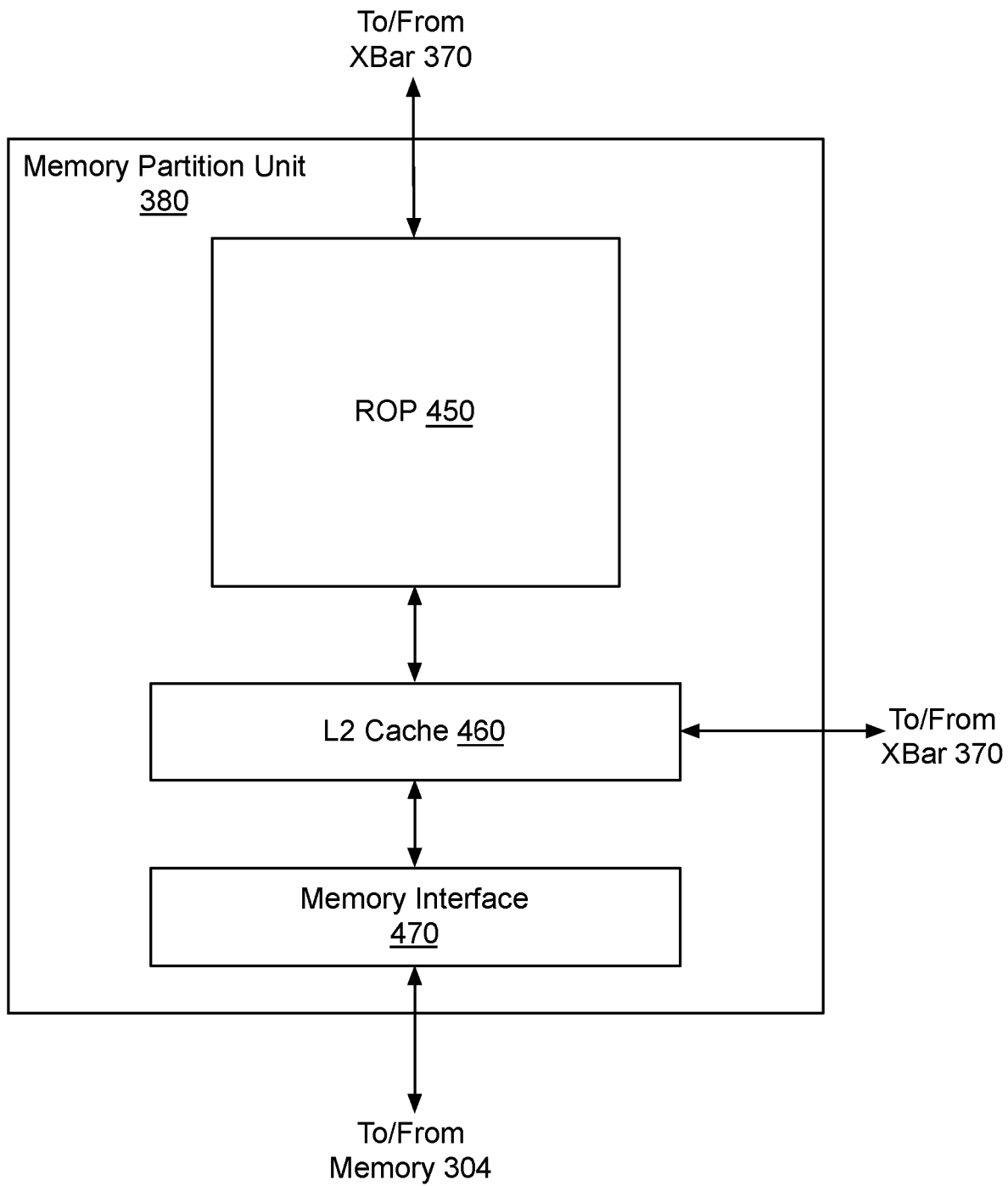
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
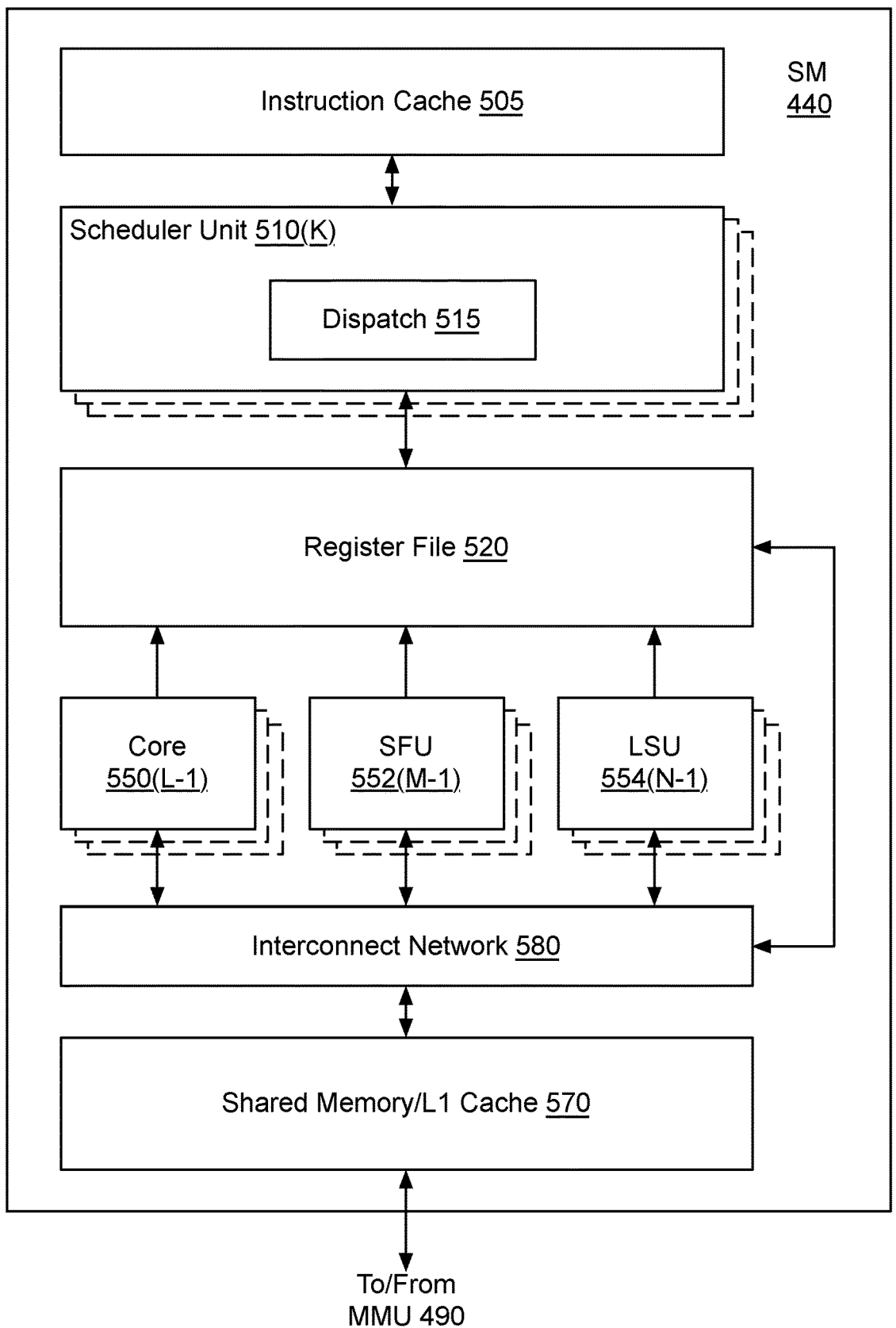
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (i.e., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
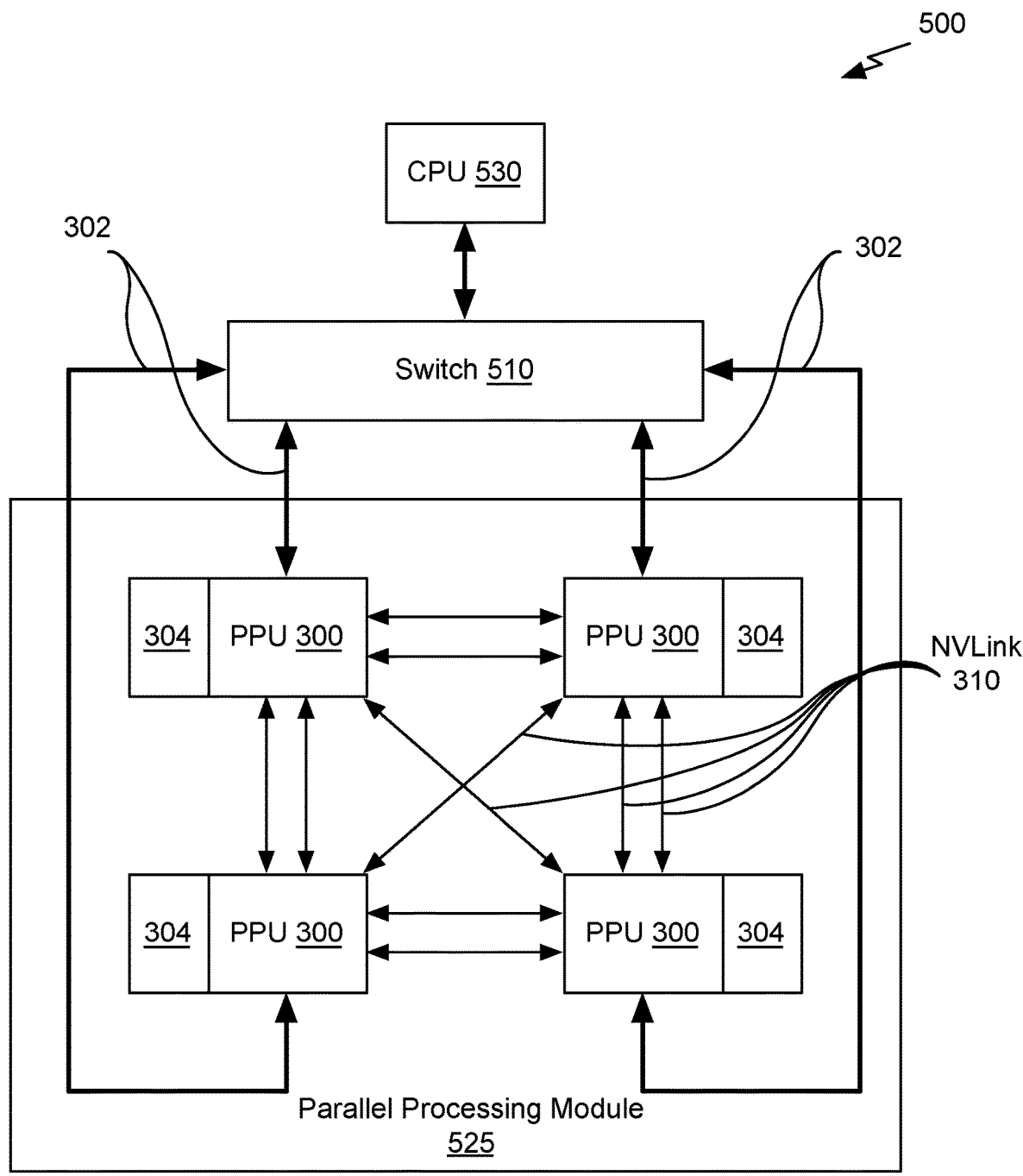
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 100 shown in FIG. 1A, the method 200 shown in FIG. 2A, or the method 240 shown in FIG. 2D. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
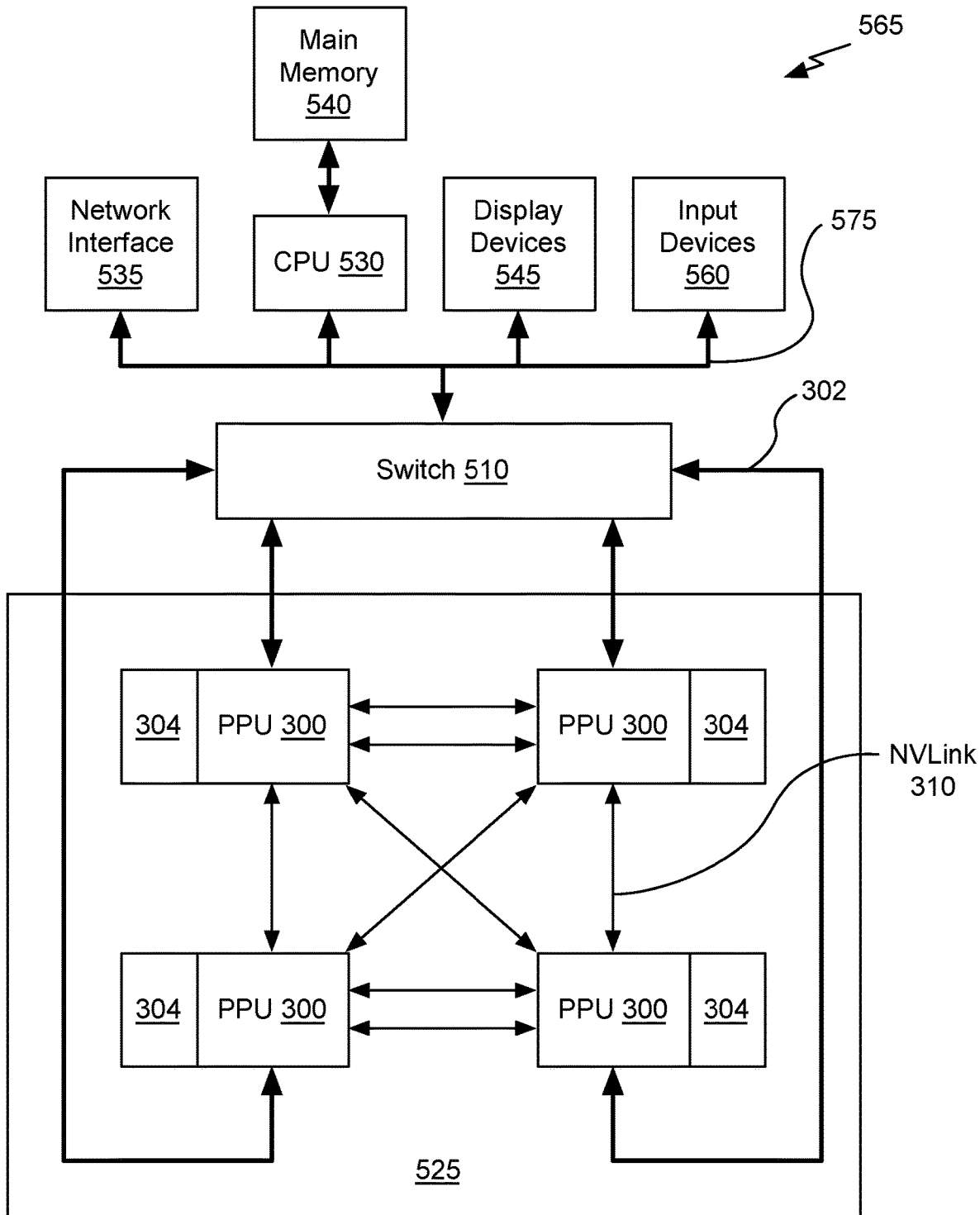
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1A, the method 200 shown in FIG. 2A, or the method 240 shown in FIG. 2D.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
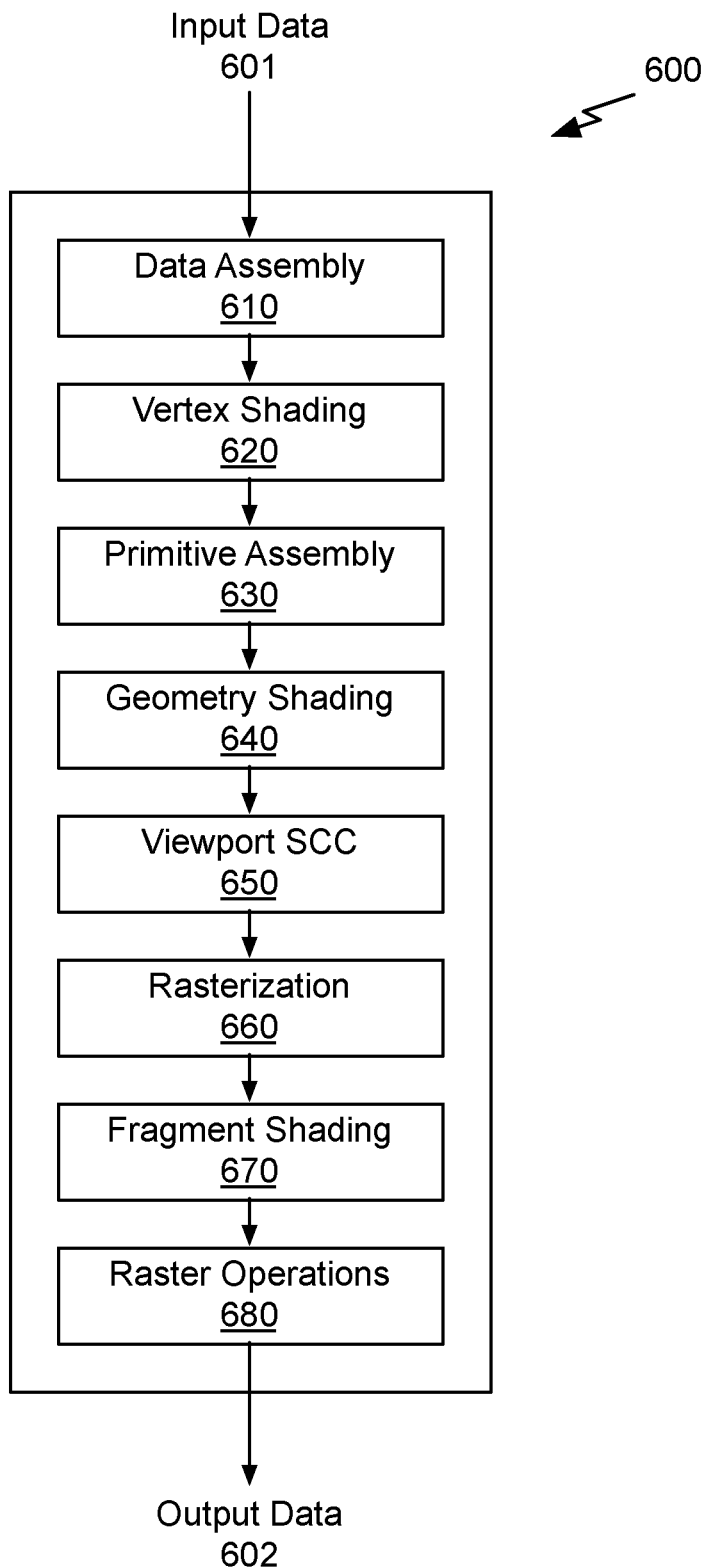
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A computer-implemented method, comprising:
   determining a path comprising a sequence of waypoints defined in a virtual environment corresponding to a physical environment of a user;
   determining at least one characteristic of the physical environment of the user;
   receiving position data for the user indicating a current path taken by the user in the physical environment, wherein the current path has deviated from the path;
   computing an updated path in the virtual environment based on the sequence of waypoints and the at least one characteristic of the physical environment;
   determining a temporary visual suppression event when a user's eyes move relative to the user's head while viewing a display device has not occurred within a time duration, wherein the temporary visual suppression event is induced in response to determining that the temporary visual suppression event has not occurred within the time duration; and
   redirecting the user to follow the updated path during the temporary visual suppression event.

2. The computer-implemented method of claim 1, wherein the path and the updated path avoid obstacles in the physical environment identified by the at least one characteristic.

3. The computer-implemented method of claim 1, wherein the redirecting comprises:
   modifying an orientation of a virtual scene corresponding to the virtual environment to direct the user to the updated path; and
   displaying the virtual scene on the display device according to the modified orientation.

4. The computer-implemented method of claim 1, wherein the at least one characteristic is a static physical obstacle.

5. The computer-implemented method of claim 1, wherein the at least one characteristic is a dynamic physical obstacle.

6. The computer-implemented method of claim 1, wherein the at least one characteristic is a physical boundary.

7. The method of claim 1, wherein the waypoints are pre-defined.

8. The method of claim 1, further comprising:
   identifying a maximum local contrast region of a virtual scene that corresponds to the virtual environment and is displayed to the user; and
   modifying at least one pixel within the maximum local contrast region to induce the temporary visual suppression event.

9. The method of claim 1, wherein an attribute of an object in the virtual environment is modified to induce the temporary visual suppression event.

10. The method of claim 1, wherein at least one pixel of the display device is modified to induce the temporary visual suppression event.

11. A system, comprising:
    a processor configured to:
    determine a path comprising a sequence of waypoints defined in a virtual environment corresponding to a physical environment of a user;
    determine at least one characteristic of the physical environment of the user;
    receive position data for the user indicating a current path taken by the user in the physical environment, wherein the current path has deviated from the path;
    compute an updated path in the virtual environment based on the sequence of waypoints and the at least one characteristic of the physical environment;
    determine a temporary visual suppression event when a user's eyes move relative to the user's head while viewing a display device has not occurred within a time duration;
    wherein the temporary visual suppression event is induced in response to determining that the temporary visual suppression event has not occurred within the time duration; and
    redirect the user to follow the updated path during the temporary visual suppression event.

12. The system of claim 11, wherein the path and the updated path avoid obstacles in the physical environment identified by the at least one characteristic.

13. The system of claim 11, wherein the redirecting comprises:
    modifying an orientation of a virtual scene corresponding to the virtual environment to direct the user to the updated path; and
    displaying the virtual scene on the display device according to the modified orientation.

14. The system of claim 13, wherein modifying the orientation comprises rotating the virtual scene relative to the user.

15. The system of claim 11, wherein the at least one characteristic is a static physical obstacle.

16. The system of claim 11, wherein the at least one characteristic is a dynamic physical obstacle.

17. The system of claim 11, wherein the at least one characteristic is a physical boundary.

18. A non-transitory, computer-readable storage medium storing instructions that, when executed by a processing unit, cause the processing unit to:
- determine a path comprising a sequence of waypoints defined in a virtual environment corresponding to a physical environment of a user;
- determine at least one characteristic of the physical environment of the user;
- receive position data for the user indicating a current path taken by the user in the physical environment, wherein the current path has deviated from the path;
- compute an updated path in the virtual environment based on the sequence of waypoints and the at least one characteristic of the physical environment;
- determine a temporary visual suppression event when a user's eyes move relative to the user's head while viewing a display device has not occurred within a time duration, wherein the temporary visual suppression event is induced in response to determining that the temporary visual suppression event has not occurred within the time duration; and
- redirect the user to follow the updated path during the temporary visual suppression event.

19. The non-transitory, computer-readable storage medium of claim 18, wherein the path and the updated path avoid obstacles in the physical environment identified by the at least one characteristic.

20. The non-transitory, computer-readable storage medium of claim 18, wherein the redirecting comprises:
- modifying an orientation of a virtual scene corresponding to the virtual environment to direct the user to the updated; and
- displaying the virtual scene on the display device according to the modified orientation.

* * * * *